(12) United States Patent
Loewen et al.

(10) Patent No.: US 10,319,483 B2
(45) Date of Patent: Jun. 11, 2019

(54) PIPING ENHANCEMENT FOR BACKFLOW PREVENTION IN A MULTIPLE LOOP, METAL COOLED NUCLEAR REACTOR SYSTEM

(71) Applicants: Eric Paul Loewen, Wilmington, NC (US); Seth Ryan Paul Strege, Wilmington, NC (US); Nicholas Francis O'Neill, Alpharetta, GA (US); Colin Christopher O'Connor, Atlanta, GA (US); Chelsea Ann Curtin, Atlanta, GA (US); Edwin Wu, Houston, TX (US)

(72) Inventors: Eric Paul Loewen, Wilmington, NC (US); Seth Ryan Paul Strege, Wilmington, NC (US); Nicholas Francis O'Neill, Alpharetta, GA (US); Colin Christopher O'Connor, Atlanta, GA (US); Chelsea Ann Curtin, Atlanta, GA (US); Edwin Wu, Houston, TX (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 546 days.

(21) Appl. No.: 14/960,511

(22) Filed: Dec. 7, 2015

(65) Prior Publication Data

US 2017/0162280 A1 Jun. 8, 2017

(51) Int. Cl.
*G21C 15/247* (2006.01)
*F04B 17/00* (2006.01)
*F04B 17/04* (2006.01)

(52) U.S. Cl.
CPC ............ *G21C 15/247* (2013.01); *F04B 17/00* (2013.01); *F04B 17/04* (2013.01); *Y02E 30/35* (2013.01)

(58) Field of Classification Search
CPC ..................................................... G21C 15/243
See application file for complete search history.

(56) References Cited

U.S. PATENT DOCUMENTS

| 1,329,559 | A | 2/1920 | Tesla |
| 4,187,874 | A | 2/1980 | Essebaggers |
| 4,278,404 | A | 7/1981 | Avanzini |
| 4,734,248 | A | 3/1988 | Dunn |
| 4,830,053 | A | 5/1989 | Shaw |
| 5,303,275 | A | 4/1994 | Kobsa |

(Continued)

FOREIGN PATENT DOCUMENTS

WO 2013/107534 A1 7/2013

OTHER PUBLICATIONS

Ryan Burnett et al., "Fluidic Diode Development and Optimization", University of California, Berkeley, May 14, 2010, pp. 1-36.

(Continued)

*Primary Examiner* — Sharon M Davis
(74) *Attorney, Agent, or Firm* — Harness, Dickey & Pierce, P.L.C.

(57) ABSTRACT

A sodium-cooled nuclear reactor includes at least one electromagnetic pump assembly and a backflow reduction pipe. The backflow reduction pipe may include an inlet, an outlet, at least one tubular section having a first length and a first diameter, and at least one fluid diode section between the inlet and the outlet.

13 Claims, 5 Drawing Sheets

(56) References Cited

U.S. PATENT DOCUMENTS

| | | | |
|---|---|---|---|
| 5,309,488 A | 5/1994 | Matsuoka | |
| 8,291,976 B2 | 10/2012 | Schultz et al. | |
| 2006/0073023 A1* | 4/2006 | Ghoshal | H02K 44/06 |
| | | | 417/50 |
| 2012/0085447 A1* | 4/2012 | Hyde | G05D 7/0635 |
| | | | 137/807 |
| 2014/0110127 A1* | 4/2014 | Zhao | E21B 43/12 |
| | | | 166/369 |
| 2014/0151062 A1* | 6/2014 | Stephenson | E21B 21/01 |
| | | | 166/373 |
| 2015/0059718 A1* | 3/2015 | Claywell | F01M 13/00 |
| | | | 123/572 |

OTHER PUBLICATIONS

International Search Report and Written Opinion issued in connection with corresponding PCT Application No. PCT/US2016/065015, dated Sep. 29, 2017.

* cited by examiner

PIPING ENHANCEMENT FOR BACKFLOW PREVENTION IN A MULTIPLE LOOP, METAL COOLED NUCLEAR REACTOR SYSTEM

BACKGROUND

Field

The present disclosure relates to a backflow reduction pipe for an electromagnetic pump.

Description of Related Art

Sodium-cooled nuclear reactors utilize electromagnetic pumps to flow sodium fluid from a heat exchanger to a bottom of a reactor core. Generally, four circuit pumps, each including two outlet pipes are used. If one pump is not operational, the other three pumps may force fluid flow back into the outlets of the non-operational pump.

SUMMARY

At least one example embodiment relates to a sodium-cooled nuclear reactor including a backflow reduction pipe.

In at least one example embodiment, a sodium-cooled nuclear reactor includes at least one electromagnetic pump assembly and a backflow reduction pipe. The backflow reduction pipe may include an inlet, an outlet, at least one tubular section having a first length and a first diameter, and at least one fluid diode section between the inlet and the outlet. The at least one tubular section is between the inlet and the outlet. The at least one fluid diode section may include a first section having a second diameter at a largest point of the first section, and a second section having a third diameter at a largest point of the second section. The first section is closer to the inlet than the second section. The at least one fluid diode section is configured to restrict backflow.

In at least one example embodiment, the second diameter is larger than each of the third diameter and the first diameter. The first section may have a first radius at a widest point thereof. The second section may have a second radius at a widest point thereof. The first radius is about 1.9 to about 2.2 times the second radius of the second section.

In at least one example embodiment, the at least one fluid diode section has a second length and the second section has a third length. The second length is about 1.9 to about 2.2 times the third length of the second section.

In at least one example embodiment, the at least one fluid diode section has a second length and the first section has a first radius at a widest point thereof. The second length of the at least one fluid diode section is about 2.1 to about 2.4 times the first radius of the first section.

In at least one example embodiment, the second section is generally cylindrical in cross-section. In at least one example embodiment, the first section is generally frustoconical in cross-section and the first section has a larger diameter towards an inlet end of the pipe and a smaller diameter towards an outlet end of the pipe.

In at least one example embodiment, the first section and the second section are generally frustoconical in cross-section.

In at least one example embodiment, the first section and the second section each have a larger diameter towards an inlet end of the pipe and a smaller diameter towards an outlet end of the pipe. The first section may include a lobe. A portion of the lobe may overlap with a portion of the at least one tubular section.

In at least one example embodiment, the backflow reduction pipe includes a plurality of fluid diode sections along a length of the backflow reduction pipe. At least one of the plurality of fluid diode sections may be centrally located along the length of the backflow reduction pipe. In at least one example embodiment, at least one of the plurality of fluid diode sections is located adjacent the inlet of the backflow reduction pipe. In at least one example embodiment, at least one of the plurality of fluid diode sections is located adjacent the outlet of the backflow reduction pipe.

In at least one example embodiment, the backflow reduction pipe includes a plurality of tubular sections. At least one of the plurality of tubular sections is between adjacent ones of the plurality of fluid diode sections.

In at least one example embodiment, a flow from the outlet to the inlet undergoes a pressure drop ranging from about 20 psi to about 25 psi. In at least one example embodiment, a flow from the inlet to the outlet undergoes a pressure drop ranging from about 5 psi to about 8 psi.

At least one example embodiment relates to a backflow reduction pipe.

In at least one example embodiment, a backflow reduction pipe for a sodium-cooled nuclear reactor includes at least one tubular section having a length and a diameter and at least one fluid diode section configured to restrict backflow. The diameter of the at least one tubular section is generally uniform along the length of the at least one tubular section. The fluid diode section may include at least one portion having a larger diameter than the diameter of the at least one tubular section, the diameter of the at least one being about 1.9 to about 2.2 times the diameter of the at least one tubular section.

At least one example embodiment relates to a method of reducing backflow in a sodium-cooled nuclear reactor.

In at least one example embodiment, a method of reducing backflow in a sodium-cooled nuclear reactor includes installing a backflow reduction pipe in at least one electromagnetic pump assembly.

At least one example embodiment relates to a method of manufacturing a backflow reduction pipe.

In at least one example embodiment, a method of manufacturing a backflow reduction pipe includes 3D printing a pipe. The pipe may include at least one tubular section having a diameter and at least one fluid diode section configured to restrict backflow. The diameter of the at least one tubular section is generally uniform along a length of the at least one tubular section. The fluid diode section includes at least one portion having a larger diameter than the diameter of the at least one tubular section. The diameter of the at least one portion is about 1.9 to about 2.2 times the diameter of the at least one tubular section.

In at least one example embodiment, a method manufacturing a backflow reduction pipe includes machining a plurality of tubular sections, each of the tubular sections having a generally uniform diameter along a length thereof, and machining a plurality of fluid diode sections configured to restrict backflow. Each of the fluid diode sections includes at least one portion having a larger diameter than a diameter of each of the tubular sections. The diameter of the at least one portion is about 1.9 to about 2.2 times the diameter of the tubular sections. The method also includes welding at least one of the plurality of fluid diode sections between adjacent ones of the tubular sections.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
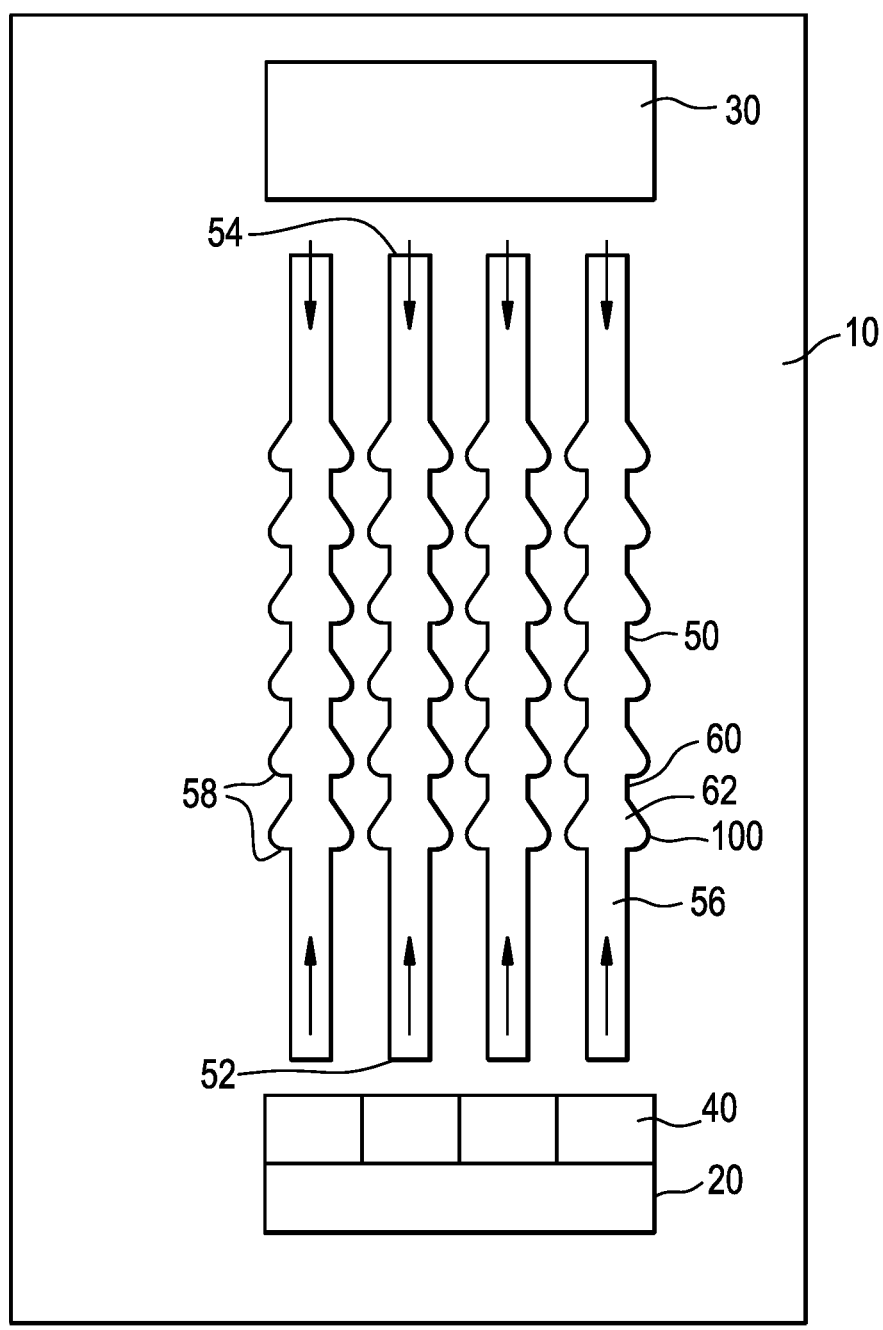
FIG. 1 is a schematic illustration of a sodium-cooled nuclear reactor including a backflow reduction pipe according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least one example embodiment relates to a sodium-cooled nuclear reactor including a backflow reduction pipe.

FIG. 1 is a schematic illustration of a sodium-cooled nuclear reactor including a backflow reduction pipe according to at least one example embodiment.

In at least one example embodiment, as shown in FIG. 1, a sodium-cooled nuclear reactor 10 includes a heat exchanger 20 and a reactor core 30. An electromagnetic pump 40 pumps sodium fluid from the heat exchanger 20 to a bottom of the reactor core 30 so that the sodium fluid moves upward through the reactor core 30. In at least one example embodiment, the sodium-cooled nuclear reactor 10 includes four electromagnetic pumps 40. Each pump includes a backflow reduction pipe 50 through which sodium fluid flows from the heat exchanger 20 to the reactor core 30.

In at least one example embodiment, the backflow reduction pipe 50 includes an inlet 52 in fluid communication with the heat exchanger 20 and an outlet 54 in fluid communication with the reactor core 30. The backflow reduction pipe 50 includes at least one tubular section 56 and at least one fluid diode section 58. The fluid diode section 58 has a higher resistance to flow in a first direction as compared to a second direction.

In at least one example embodiment, the at least one tubular section 56 has a first length and a first diameter. The at least one tubular section 56 is between the inlet 52 and the outlet 54.

In at least one example embodiment, the at least one fluid diode section 58 includes a first section 62 and a second section 60. The first section 62 of each fluid diode section 58 is closer to the inlet 52 of the backflow reduction pipe 50 than the second section 60. In at least one example embodiment, the first section 62 has a second diameter at a largest diameter of the first section 62. The second section 60 has a third diameter at a largest diameter of the second section 60. The at least one fluid diode section 58 is configured to restrict backflow. In at least one example embodiment, the second diameter is larger than each of the third diameter and the first diameter.

In at least one example embodiment, the second section 60 is generally cylindrical in cross-section (not shown). In at least one example embodiment, the first section 62 is generally frustoconical in cross-section and the first section 62 has a larger diameter towards the inlet 52 of the pipe 50 and a smaller diameter towards the outlet 54 of the pipe 50.

In at least one example embodiment, the first section 62 may include a lobe 100 extending around a circumference of the first section 62. A portion of the lobe 100 may overlap with a portion of the tubular section 56 that is positioned between the inlet 52 and the first section 62. An eddy current may form in the backflow direction (from outlet 54 to inlet 52) at the lobe 100.

In at least one example embodiment, the first section 62 and the second section 60 are generally frustoconical in cross-section.

In at least one example embodiment, the first section 62 and the second section 60 each have a larger diameter towards the inlet 52 of the pipe 50 and a smaller diameter towards the outlet 54 of the pipe 50.

In at least one example embodiment, the backflow reduction pipe includes a plurality of fluid diode sections 58 along a length of the backflow reduction pipe 50. At least one of the plurality of fluid diode sections 58 may be centrally located along the length of the backflow reduction pipe 50.

In at least one example embodiment, a flow from the outlet 54 to the inlet 52 undergoes a pressure drop ranging from about 20 psi to about 25 psi. In at least one example embodiment, a flow from the inlet 52 to the outlet 54 undergoes a pressure drop ranging from about 5 psi to about 8 psi.

In at least at one example embodiment, in a normal flow direction (from inlet 52 to outlet 54), the second section 60 increases forward velocity of the fluid to propel the fluid past the first section 62, which has minimal effect on the forward flow of the fluid. In a backflow direction (from outlet 54 to inlet 52), a decrease in area as a result of the second section 60 increases pressure slightly, but eddies may be formed due to fluid expansion in the first section 62, which may create a large pressure drop.

In at least one example embodiment, the second section 60 may restrict flow in the backflow direction without the use of moving parts and without additional electrical and/or control system interfaces. The flow restriction forces flow from operable pumps to flow up through the reactor core 30 as opposed to back into inoperable pump. This increases the power output of the reactor during a pump shutdown. This also increases operability as one of four pumps shutting down would otherwise require a reactor trip.

In at least one example embodiment, the fluid diode section 58 is formed of stainless steel or any other suitable material.

In at least one example embodiment, the backflow reduction pipe 50 may be a single, uniform pipe. In other example embodiments, the fluid diode section 58 is a separate piece that is welded or otherwise attached between adjacent tubular sections 56. The first section 62 and the second section 60 of the fluid diode section 58 may be integrally formed or formed separately.

In at least one example embodiment, the backflow reduction pipe 50 is about 10 feet to about 30 feet long. Each of the fluid diode sections may be about 2 feet to about 6 feet long. The backflow reduction pipe 50 may include one to ten fluid diode sections.

Figure 2:
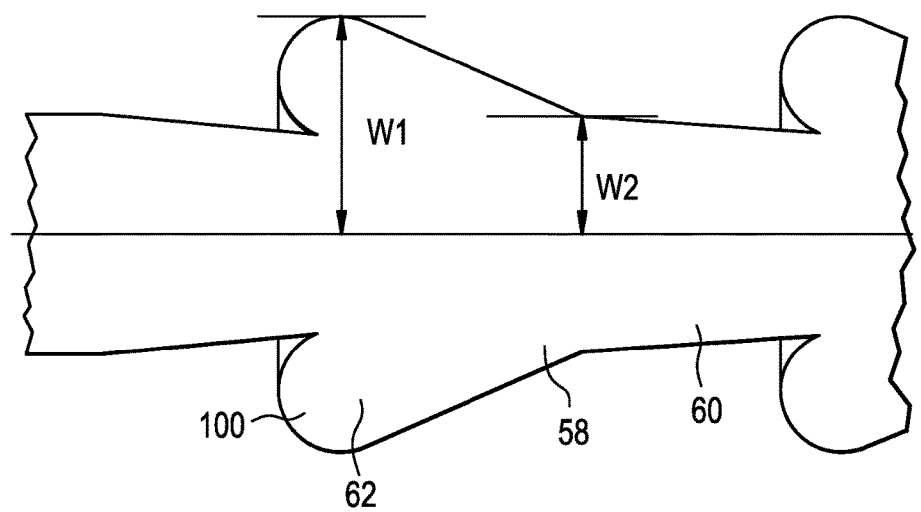
FIG. 2 an enlarged view of a portion of a backflow reduction pipe according to at least one example embodiment.

FIG. 2 an enlarged view of a portion of a backflow reduction pipe according to at least one example embodiment.

In at least one example embodiment, the first section 62 may have a first radius (W1) at a largest diameter of the first section 62. The second section 60 may have a second radius (W2) at a largest diameter of the second section 60. The first radius (W1) of the first section 62 is about 1.9 to about 2.2 times the second radius (W2) of the second section 60.

Figure 3:
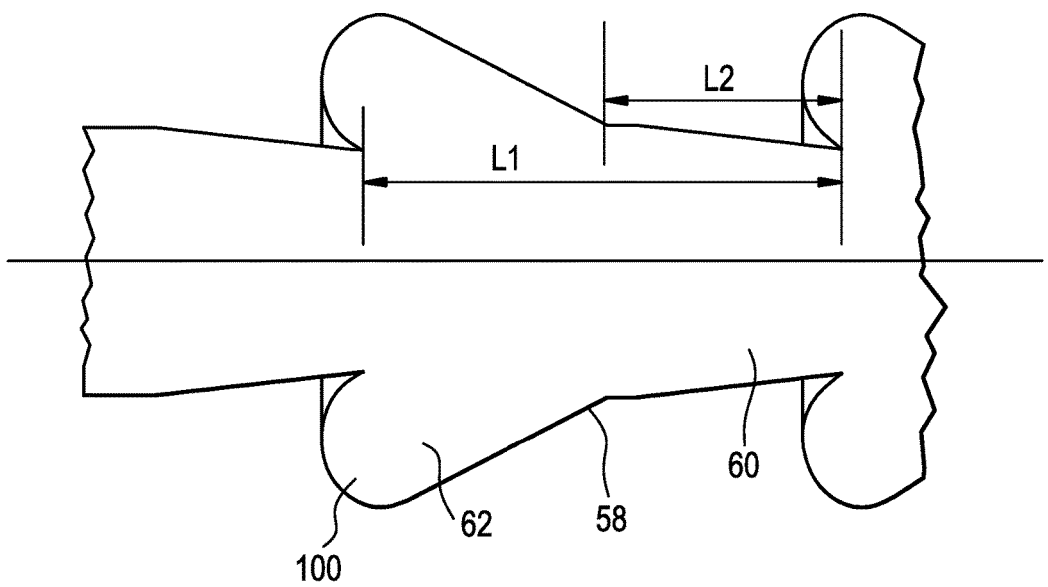
FIG. 3 an enlarged view of a portion of a backflow reduction pipe according to at least one example embodiment.

FIG. 3 an enlarged view of a portion of a backflow reduction pipe according to at least one example embodiment.

In at least one example embodiment, the at least one fluid diode section 58 has a second length (L1) and the second section 60 has a third length (L2). The second length (L1) is about 1.9 to about 2.2 times the third length (L2) of the second section 60.

Figure 4:
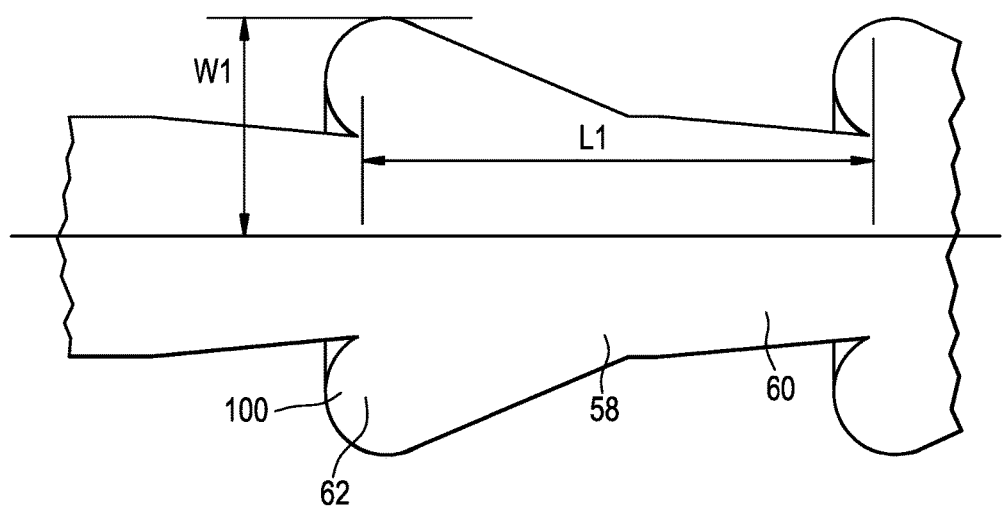
FIG. 4 an enlarged view of a portion of a backflow reduction pipe according to at least one example embodiment.

FIG. 4 an enlarged view of a portion of a backflow reduction pipe according to at least one example embodiment.

In at least one example embodiment, the at least one fluid diode section 58 has the second length (L1) and the first section 62 has the first radius (W1) at a widest point thereof. The second length (L1) of the at least one fluid diode section 58 is about 2.1 to about 2.4 times the first radius (W1) of the first section 62.

Figure 5:
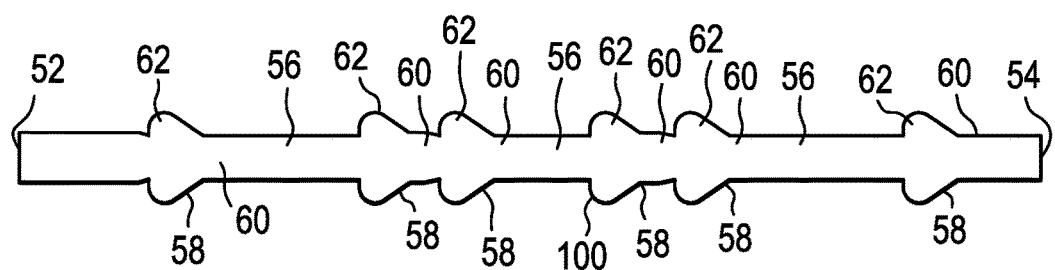
FIG. 5 is an illustration of a backflow reduction pipe including spaced apart fluid diode sections according to at least one example embodiment.

FIG. 5 is an illustration of a backflow reduction pipe including spaced apart fluid diode sections according to at least one example embodiment.

In at least one example embodiment, the backflow reduction pipe 50 includes a plurality of tubular sections 56. At least one of the plurality of tubular sections 56 is between adjacent ones of the plurality of fluid diode sections 58. The length of each of the tubular section 56 may vary, and a pattern of tubular sections 56 and fluid diode sections 58 may be formed along the length of the backflow reduction pipe 50.

Figure 6:
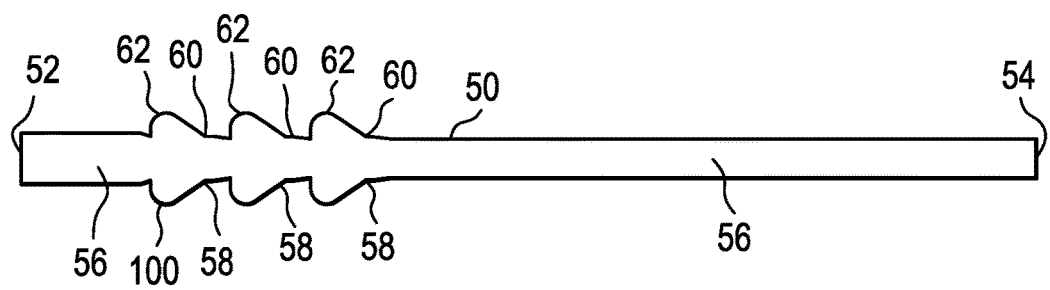
FIG. 6 is an illustration of a backflow reduction pipe including at least one fluid diode section near an inlet of the pipe according to at least one example embodiment.

FIG. 6 is an illustration of a backflow reduction pipe including at least one fluid diode section near an inlet of the pipe according to at least one example embodiment.

In at least one example embodiment, at least one fluid diode section 58 is located adjacent the inlet 52 of the backflow reduction pipe 50. In at least one example embodiment, at least one fluid diode section 58 is located closer to the inlet 52 of the backflow reduction pipe 50 than the outlet 54 of the backflow reduction pipe 50.

Figure 7:
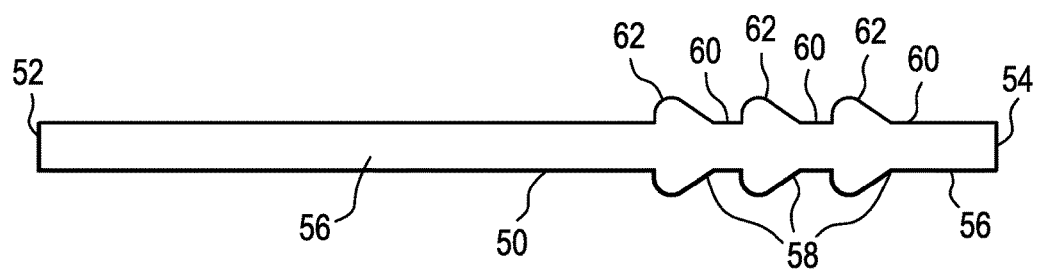
FIG. 7 is an illustration of a backflow reduction pipe including at least one fluid diode section near an outlet of the pipe according to at least one example embodiment.

FIG. 7 is an illustration of a backflow reduction pipe including at least one fluid diode section near an outlet of the pipe according to at least one example embodiment.

In at least one example embodiment, at least one fluid diode section 58 is located adjacent to the outlet 54 of the backflow reduction pipe 50. In at least one example embodiment, at least one fluid diode section 58 is located closer to the outlet 54 of the backflow reduction pipe 50 than the inlet 52.

Figure 8:
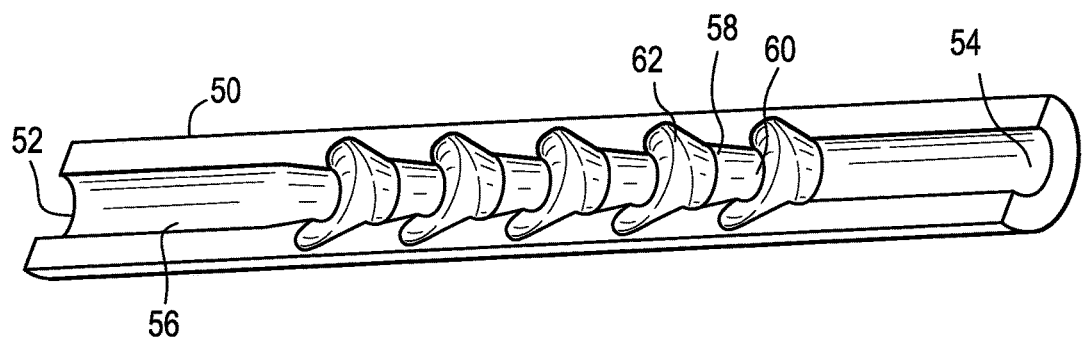
FIG. 8 is an illustration of a backflow reduction pipe according to at least one example embodiment.

FIG. 8 is an illustration of a backflow reduction pipe according to at least one example embodiment.

In at least one example embodiment, as shown in FIG. 8, the backflow reduction pipe 50 may have a substantially uniform outer diameter. An inner diameter of the backflow reduction pipe 50 may vary along a length thereof to form the tubular section 56 and the fluid diode section 58 including the first section 62 and the second section 60 within the backflow reduction pipe 50.

Sodium-cooled nuclear reactors utilize electromagnetic pumps to flow sodium fluid from a heat exchanger to a bottom of a reactor core. Generally, four circuit pumps, each including two outlet pipes are used. If one pump is not operational, the other three pumps may force fluid flow back into the outlets of the non-operational pump.

The addition of a fluid diode section 58 to the backflow reduction pipe aids in forming a pressure gradient in the backflow direction without disrupting flow in the normal direction. Thus, the backflow reduction pipe provides flow resistance in the backflow direction without disrupting the natural circulation pathway, and allows for operation approaching 75% of rated power with three pump operation. The backflow reduction pipe improves the operability and reliability of sodium pumped systems.

Using computational fluid dynamic (CFD) analysis, a generally straight pipe (not shown) may have a pressure drop of about 0.2 psi, and the flow resistance is the same in either direction. In contrast, also using the CFD analysis, the backflow resistance pipe 50 having a same length as the straight pipe is expected to increase pressure drop from about 0.2 psi to about 6 psi. When flow is reversed (from outlet 54 to inlet 52), the pressure is expected to go up about four times or to about 24 psi. Thus, compared to a straight pipe, a substantial increase in flow resistance due to backflow may be demonstrated. In addition, forward velocity through the second section 60 may be accelerated to allow a bypass of the geometric first section 62. The backflow direction may show a substantial eddy formation adjacent the lobes 100 of the first section 62.

The increase in core flow, which is directly correlated with reactor power, may be calculated compared to a pipe under a single pump trip scenario using the CFD analysis data. Assuming that a pump piping nominally causes a 5 psi pressure drop in addition to the fluid diode section 58 pressure drop, the core flow increases from about 34% to greater than 52% out of a possible 75%. The 18% increase in core flow for a single reactor corresponds to about a 54 MW increase.

In at least one example embodiment, the use of the backflow reduction pipe 50 prevents the need to trip a reactor running on multiple independent electromagnetic pumps when one of the pumps fails. The use of the backflow reduction pipe 50 provides a way to keep the heat exchange flow in the correct direction while producing steam at a reduced rate. In addition, the backflow reduction pipe 50 may be modular so that the pipe 50 can be tailored for specific conditions. The combination of the first section 62 and the second section 60 increases efficiency of pressure ratio. The backflow reduction pipe 50 also allows better coolant mixing in either direction and increases the life time capacity factor through operation during single pump failure.

At least one example embodiment relates to a method of reducing backflow in a sodium-cooled nuclear reactor.

In at least one example embodiment, a method of reducing backflow in a sodium-cooled nuclear reactor includes installing a backflow reduction pipe in at least one electromagnetic pump assembly.

At least one example embodiment relates to a method of manufacturing a backflow reduction pipe.

In at least one example embodiment, a method of manufacturing a backflow reduction pipe 50 includes 3D printing the backflow reduction pipe 50. The pipe 50 may include at least one tubular section 56 having a diameter and at least one fluid diode section 58 configured to restrict backflow. One or more of the at least one tubular section 56 and the at least one fluid diode section 58 may be 3D printed. In at least one example embodiment, the at least one tubular section 56 and the at least one fluid diode section 58 are integrally formed via 3D printing. The diameter of the at least one tubular section 56 is generally uniform along a length of the at least one tubular section 56. The fluid diode section 58 includes at least one portion having a larger diameter than the diameter of the at least one tubular section 56. The diameter of the at least one portion is about 1.9 to about 2.2 times the diameter of the at least one tubular section.

In at least one example embodiment, a method manufacturing a backflow reduction pipe includes machining a plurality of tubular sections 56. Each of the tubular sections 56 may have a generally uniform diameter along a length thereof. The method may also include machining a plurality of fluid diode sections 58 that are configured to restrict backflow. Each of the fluid diode sections 58 may include at least one portion having a larger diameter than a diameter of each of the tubular sections 56. The diameter of the at least one portion is about 1.9 to about 2.2 times the diameter of the tubular sections 56. The method may also include welding at least one of the plurality of fluid diode sections 58 between adjacent ones of the tubular sections 56.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A sodium-cooled nuclear reactor comprising:
   at least one electromagnetic pump assembly, the electromagnetic pump assembly including, a backflow reduction pipe including, an inlet,
an outlet,
at least one tubular section having a first length and a first diameter, the at least one tubular section between the inlet and the outlet; and
at least one fluid diode section between the inlet and the outlet and configured to restrict backflow, the at least one fluid diode section including,
  a first section having a second diameter at a largest point of the first section, and
  a second section having a third diameter at a largest point of the second section,
  the first section closer to the inlet than the second section, the first section having a first radius at a widest point thereof, the second section having a second radius at a widest point thereof, the first radius being about 1.9 to about 2.2 times the second radius of the second section, and the first section and the second section being generally frustoconical in cross-section.

2. The sodium-cooled nuclear reactor of claim 1, wherein the second diameter is larger than each of the third diameter and the first diameter.

3. The sodium-cooled nuclear reactor of claim 1, wherein the at least one fluid diode section has a second length and the second section has a third length, and wherein the second length is about 1.9 to about 2.2 times the third length of the second section.

4. The sodium-cooled nuclear reactor of claim 1, wherein the at least one fluid diode section has a second length, and wherein the second length of the at least one fluid diode section is about 2.1 to about 2.4 times the first radius of the first section.

5. The sodium-cooled nuclear reactor of claim 1, wherein the first section has a larger diameter towards an inlet end of the pipe and a smaller diameter towards an outlet end of the pipe.

6. The sodium-cooled nuclear reactor of claim 1, wherein the first section and the second section each have a larger diameter towards an inlet end of the pipe and a smaller diameter towards an outlet end of the pipe and wherein the first section includes a lobe, a portion of a length of the lobe overlapping with a portion of a the length of the at least one tubular section along a length of the backflow reduction pipe.

7. The sodium-cooled nuclear reactor of claim 1, wherein the backflow reduction pipe includes a plurality of fluid diode sections along a length of the backflow reduction pipe.

8. The sodium-cooled nuclear reactor of claim 7, wherein at least one of the plurality of fluid diode sections is centrally located along the length of the backflow reduction pipe.

9. The sodium-cooled nuclear reactor of claim 7 wherein at least one of the plurality of fluid diode sections is located adjacent the inlet of the backflow reduction pipe.

10. The sodium-cooled nuclear reactor of claim 7, wherein at least one of the plurality of fluid diode sections is located adjacent the outlet of the backflow reduction pipe.

11. The sodium-cooled nuclear reactor of claim 7, wherein the backflow reduction pipe includes a plurality of tubular sections, and wherein at least one of the plurality of tubular sections is between adjacent ones of the plurality of fluid diode sections.

12. The sodium-cooled nuclear reactor of claim 1, wherein a flow from the outlet to the inlet undergoes a pressure drop ranging from about 20 psi to about 25 psi based on an internal structure of the backflow reduction pipe.

13. The sodium-cooled nuclear reactor of claim 1, wherein a flow from the inlet to the outlet undergoes a pressure drop ranging from about 5 psi to about 8 psi based on an internal structure of the backflow reduction pipe.

* * * * *